United States Patent [19]
Goodwin, III

[11] Patent Number: 5,473,146
[45] Date of Patent: Dec. 5, 1995

[54] SYSTEM AND METHOD FOR CONNECTING PRODUCT INFORMATION WITH ELECTRONIC SHELF DISPLAYS

[75] Inventor: John C. Goodwin, III, Lawrenceville, Ga.

[73] Assignee: AT&T Global Information Solutions, Dayton, Ohio

[21] Appl. No.: 223,267

[22] Filed: Apr. 4, 1994

[51] Int. Cl.⁶ .................................................. G06K 15/00
[52] U.S. Cl. ........................................... 235/383; 235/472
[58] Field of Search ...................................... 235/383, 472

[56] References Cited

U.S. PATENT DOCUMENTS

| | | | |
|---|---|---|---|
| 5,095,195 | 3/1992 | Harman et al. | 235/383 |
| 5,111,196 | 5/1992 | Hunt | 235/383 |
| 5,172,314 | 12/1992 | Poland et al. | 235/383 |
| 5,241,467 | 8/1993 | Failing et al. | 235/383 |
| 5,250,789 | 10/1993 | Johnson | 235/383 |

*Primary Examiner*—Harold Pitts
*Attorney, Agent, or Firm*—Paul W. Martin

[57] ABSTRACT

A system and method for connecting product information with electronic shelf displays. The system includes a first database at a place where the merchandise items are sold containing information about the items, a second database at another place containing identification information about the electronic shelf displays, a first computer terminal at the one place for downloading the item information, and a second computer terminal at the other place for receiving the downloaded item information and for matching the item information to the electronic shelf display identification information. The system also includes a hand-held scanner for obtaining the item information. Item bar code labels are preferably arranged into groups and scanned by group. A programming bar code label may be used to program the scanner for each group scan. Electronic shelf display information is also obtained by scanning bar code labels on groups of displays.

12 Claims, 7 Drawing Sheets

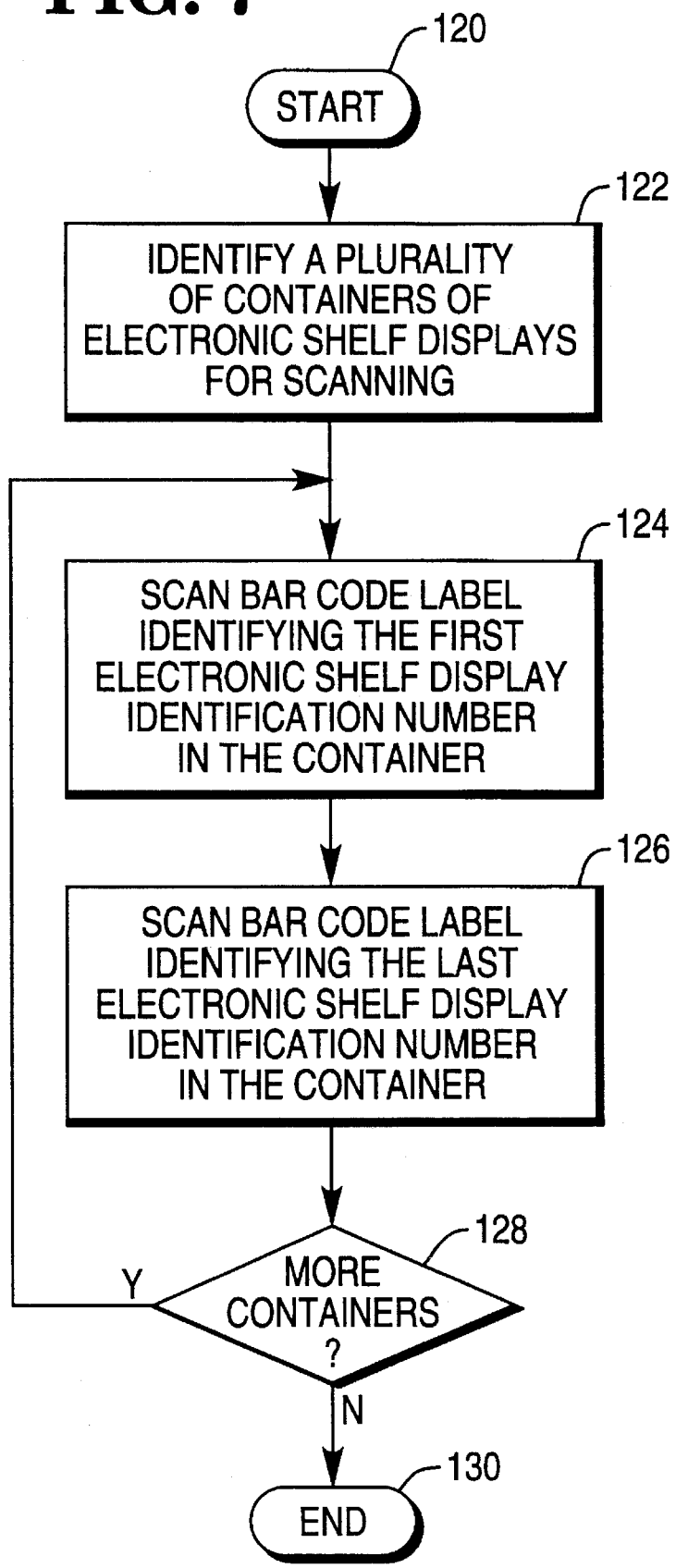

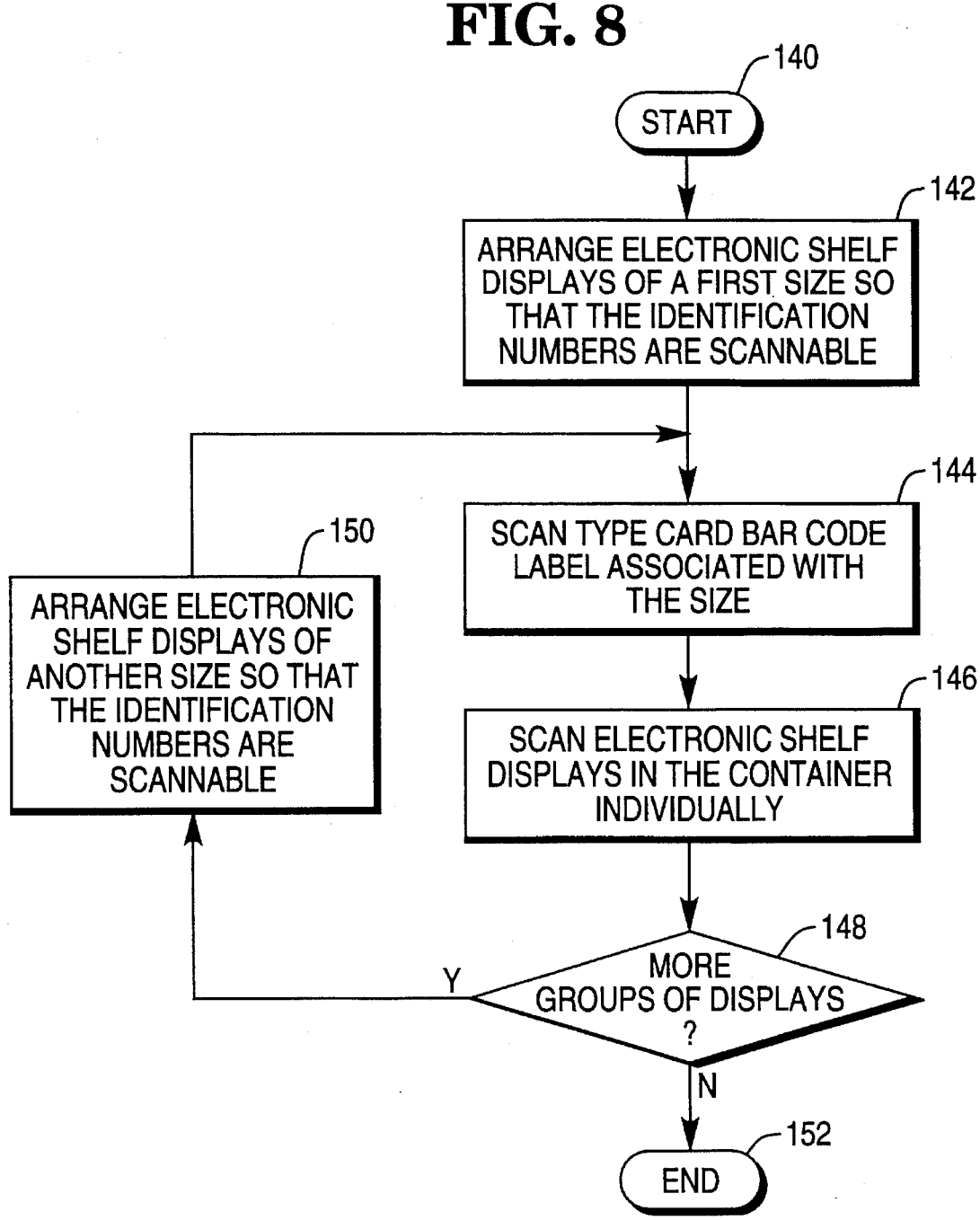

SYSTEM AND METHOD FOR CONNECTING PRODUCT INFORMATION WITH ELECTRONIC SHELF DISPLAYS

CROSS REFERENCE TO RELATED APPLICATION

The present invention is related to commonly assigned and co-pending U.S. application entitled, "System And Method For Printing Overlays For Electronic Display Devices", invented by John C. Goodwin, and having a docket number of 6042.

BACKGROUND OF THE INVENTION

The present invention relates to electronic displays such as electronic shelf labels, and more specifically to a system and method for connecting product information with electronic shelf displays.

Electronic shelf label systems typically include a plurality of electronic displays for the items in a store. The electronic displays are coupled to a central server from where prices for all of the displays can be changed.

In order to reduce the cost of such systems, only a limited amount of information, including price information, is displayed electronically. Item descriptions and product codes are not likely to change. Therefore, such information is typically displayed through signs or overlays attached to the electronic shelf label.

All electronic shelf displays must be initialized. Initializing involves matching individual product codes and information with individual electronic shelf displays. Known methods for initializing are labor-intensive. A store employee walks through aisles, obtains product information on one product at a time, and matches the product with a single electronic shelf display.

Therefore, it would be desirable to provide an improved method for matching product information to electronic shelf displays, especially during initial installation of the electronic shelf displays.

SUMMARY OF THE INVENTION

In accordance with the teachings of the present invention, a system and method for connecting product information with electronic shelf displays is provided. The system includes a first database at a place where the merchandise items are sold containing information about the items, a second database at another place containing identification information about the electronic shelf displays, a first computer terminal at the one place for downloading the item information, and a second computer terminal at the other place for receiving the downloaded item information and for matching the item information to the electronic shelf display identification information. The system also includes a hand-held scanner for obtaining the item information.

Item bar code labels are preferably arranged into groups and scanned by group. A programming bar code label may be used to program the scanner for each group scan.

Electronic shelf display information is also obtained by scanning bar code labels on groups of displays.

Item information and electronic shelf display information are associated together in a list stored within a database.

It is accordingly an object of the present invention to provide a system and method for connecting product information with electronic shelf displays.

It is another object of the present invention to provide a system and method for connecting product information with electronic shelf displays for initially setting up an electronic shelf label system in a retail establishment.

It is another object of the present invention to provide a system and method for connecting product information with electronic shelf displays that minimizes the store labor required for initially setting up an electronic shelf label system in a retail establishment.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 7 is a flow diagram illustrating a method of obtaining electronic shelf display information; and FIG. 8 is a flow diagram illustrating an alternate method of obtaining electronic shelf display information.

DETAILED DESCRIPTION OF THE PREFERRED EMBODIMENT

Figure 1:
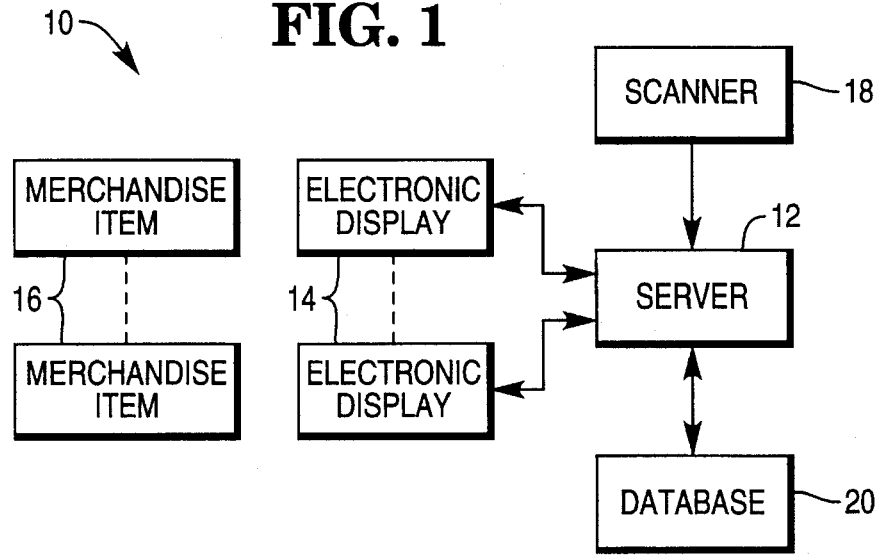
FIG. 1 is a block diagram of a first embodiment of the electronic shelf label system including the system of the present invention.

Referring now to FIG. 1, a first embodiment of the electronic shelf label system 10 includes server 12, electronic shelf displays 14, scanner 18, and database 20.

Server 12 controls operation of system 10. Prices displayed at each of electronic shelf displays 14 may be changed by server 12. Server 12 connects product codes with electronic shelf display identification numbers under the method of the present invention.

Electronic shelf displays 14 preferably display price information for adjacent merchandise items 16. Electronic shelf displays 14 may be coupled to server 12 through wire cables or through wireless transceivers mounted in both electronic shelf displays 14 and server 12.

Scanner 18 scans product codes for merchandise items 16 and downloads these product codes to server 12. Scanner 18 is preferably a portable hand-held scanner with product code storage capability.

Database 20 organizes the product codes and the associated electronic shelf display identification numbers.

Figure 2:
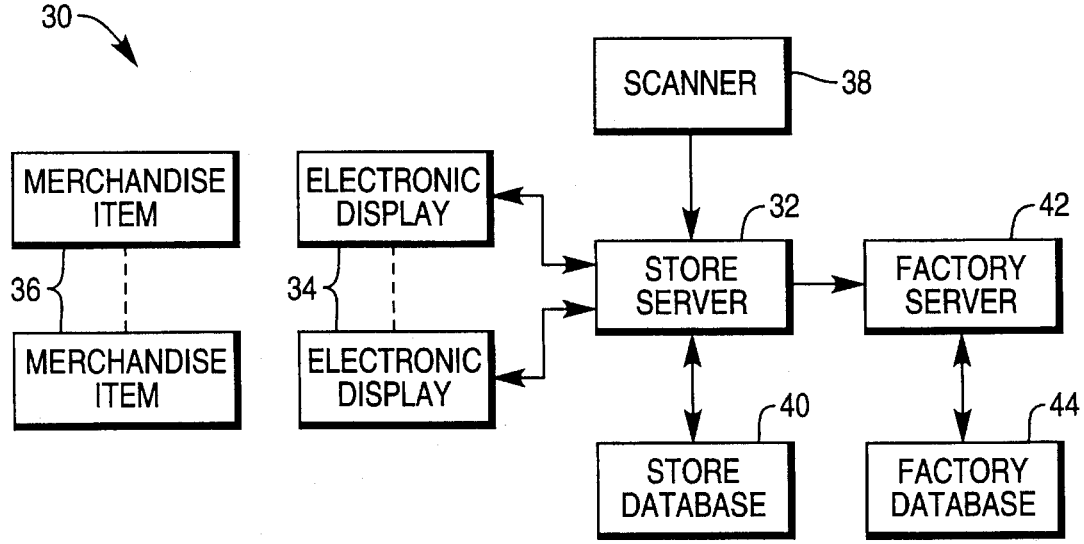
FIG. 2 is a block diagram of a second embodiment of the electronic shelf label system including the system of the present invention.

Referring now to FIG. 2, a second embodiment 30 of the electronic shelf label system includes store server 32, electronic shelf displays 34, scanner 38, and store database 40, factory server 42, and factory database 44.

Store server 32 displays prices at each of electronic shelf displays 34 which may be changed by server 32.

Electronic shelf displays 34 preferably display price information for adjacent merchandise items 36. Electronic shelf displays 34 may be coupled to server 32 through wire cables or through wireless transceivers mounted in both electronic shelf displays 34 and server 32.

Scanner 38 scans product codes for merchandise items 36 and downloads these product codes to server 32. Scanner 38 is preferably a portable hand-held scanner with product code storage capability.

Store database 40 organizes the product codes and the associated electronic shelf display identification numbers.

Factory server 42 downloads product information from store server 32 and connects product codes with electronic shelf display identification numbers under the method of the present invention.

Factory database 44 stores the downloaded product information and the electronic shelf display identification numbers.

Figure 3:
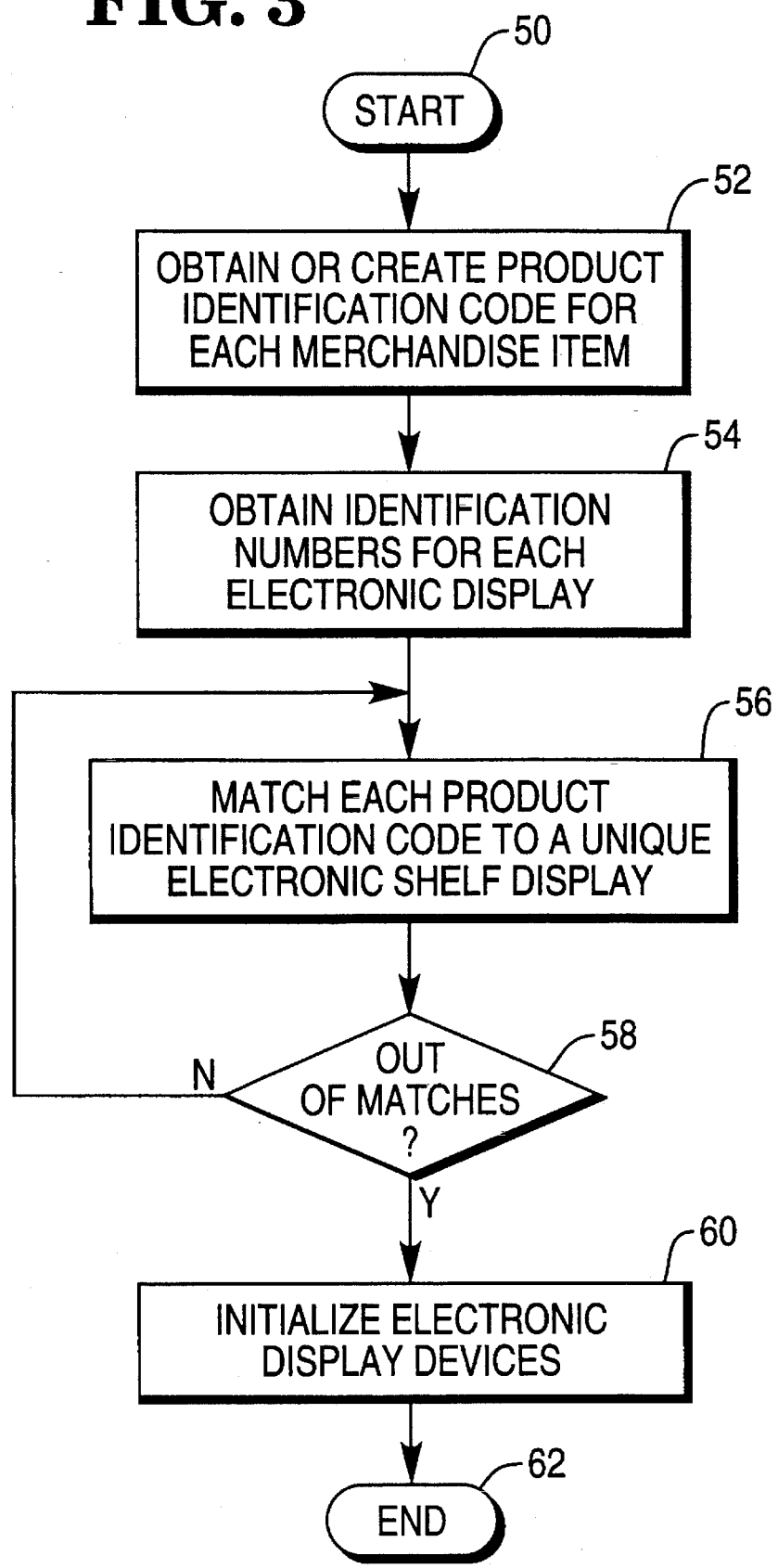
FIG. 3 is a flow diagram illustrating a method for connecting product information to electronic shelf display information.

Turning now to FIG. 3, a method for connecting product information with electronic shelf displays begins with START 50.

In step 52, server 12 obtains a product identification code for each merchandise item from inventory database 20. If a merchandise item is new, its product identification number may be entered into the database at this time.

In step 54, server 12 obtains identification numbers for each electronic display 14. These identification numbers and the corresponding locations of electronic shelf displays 14 may also be stored in database 20. For system 30 of FIG. 2, factory server 42 obtains the identification numbers for each electronic display 34 and stores the numbers in factory database 44.

In step 56, server 12 matches each product identification code to a unique electronic shelf display 14 and stores the association in database 20. Two data files, one containing the product identification codes and one containing the electronic shelf display identification codes are read by server 12, which uses the two data files to establish two input queues. Server 12 picks one product identification code entry and one electronic shelf display identification code entry from the input queues and merges the two entries to create a single entry which it stores in database 20. For system 30 of FIG. 2, factory server 42 matches each product identification code to a unique electronic shelf display 34 in a similar way and stores the association in database 44.

In step 58, server 12 determines whether there are any remaining product identification numbers to be matched with electronic shelf displays 14. If so, then the method loops back to step 56 until there are no product identification numbers left. For system 30 of FIG. 2, factory server 42 determines whether there are any remaining product identification numbers to be matched with electronic shelf displays 34.

If there are no remaining product identification numbers to be matched with electronic shelf displays 14, the method proceeds to step 60, in which server 12 initializes electronic shelf displays 14 with current information such as item price, unit price, location code, stock count, facings, and unique identifiers, as appropriate. For system 30 of FIG. 2, factory server 42 initializes electronic shelf displays 34 with current information such as item price, unit price, location code, stock count, facings, and unique identifiers, as appropriate.

In step 62, the method ends.

Figure 4:
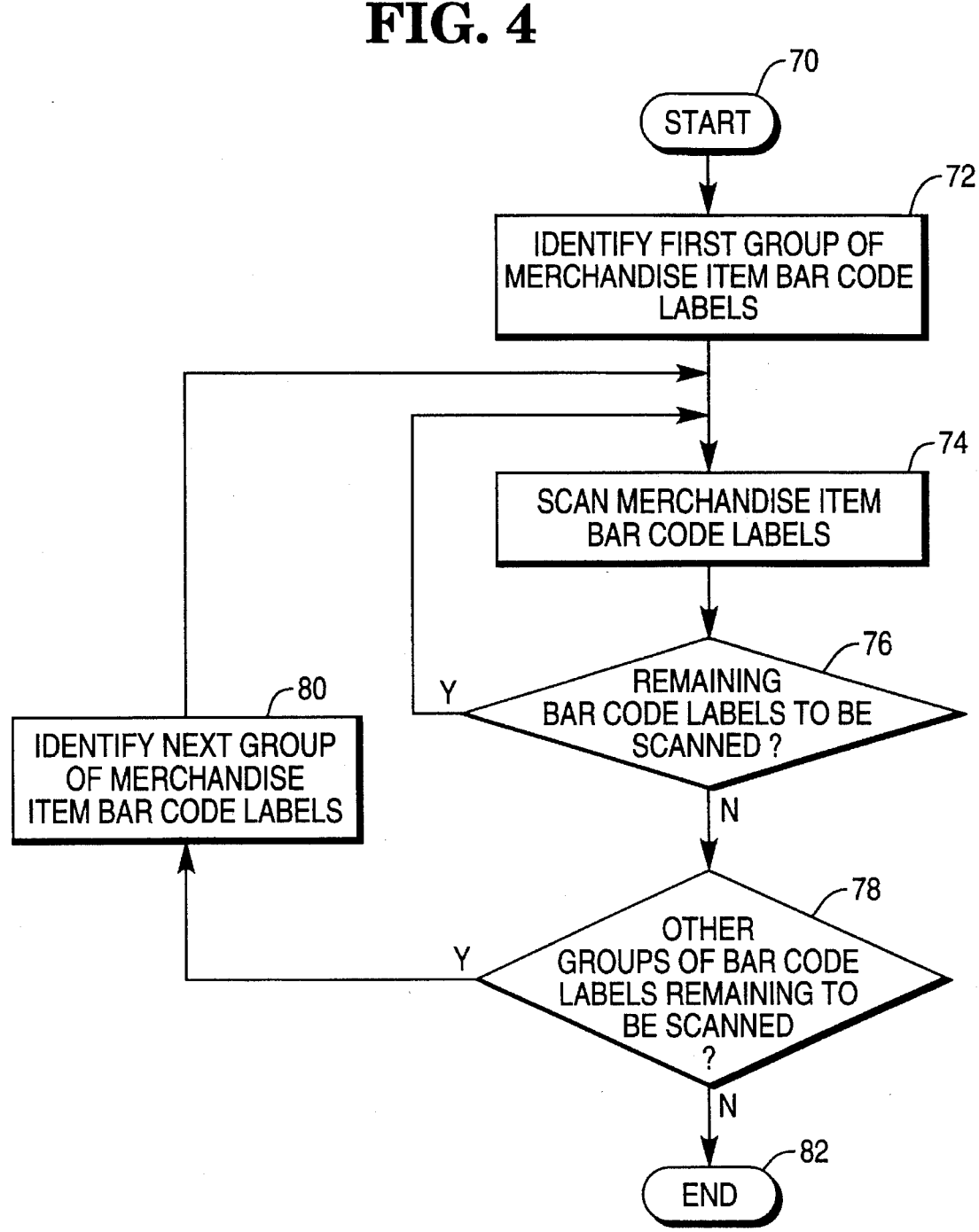
FIG. 4 is a flow diagram illustrating a method of obtaining product information.

Turning now to FIG. 4, step 52 of FIG. 3 is explained in more detail, beginning with START 70. In a store environment having many types of electronic shelf displays 14, including small and large, bar code labels are associated with each type of display 14 and are processed as a group.

In step 72, merchandise items having bar code labels associated with a first type of electronic shelf display 14 are located and identified.

In step 74, the bar code labels associated with the first type are scanned.

In step 76, the method loops back to step 74 until all of the bar code labels associated with the first type are scanned.

In step 78, the method determines whether additional groups of bar code labels associated with additional types of displays 14 remain to be scanned. If so the method loops back to step 74 though step 80, in which merchandise items having bar code labels associated with a next type of display 14 are located and identified as a group to be scanned.

After all of the groups of bar code labels have been scanned, the method ends in step 82.

Figure 5:
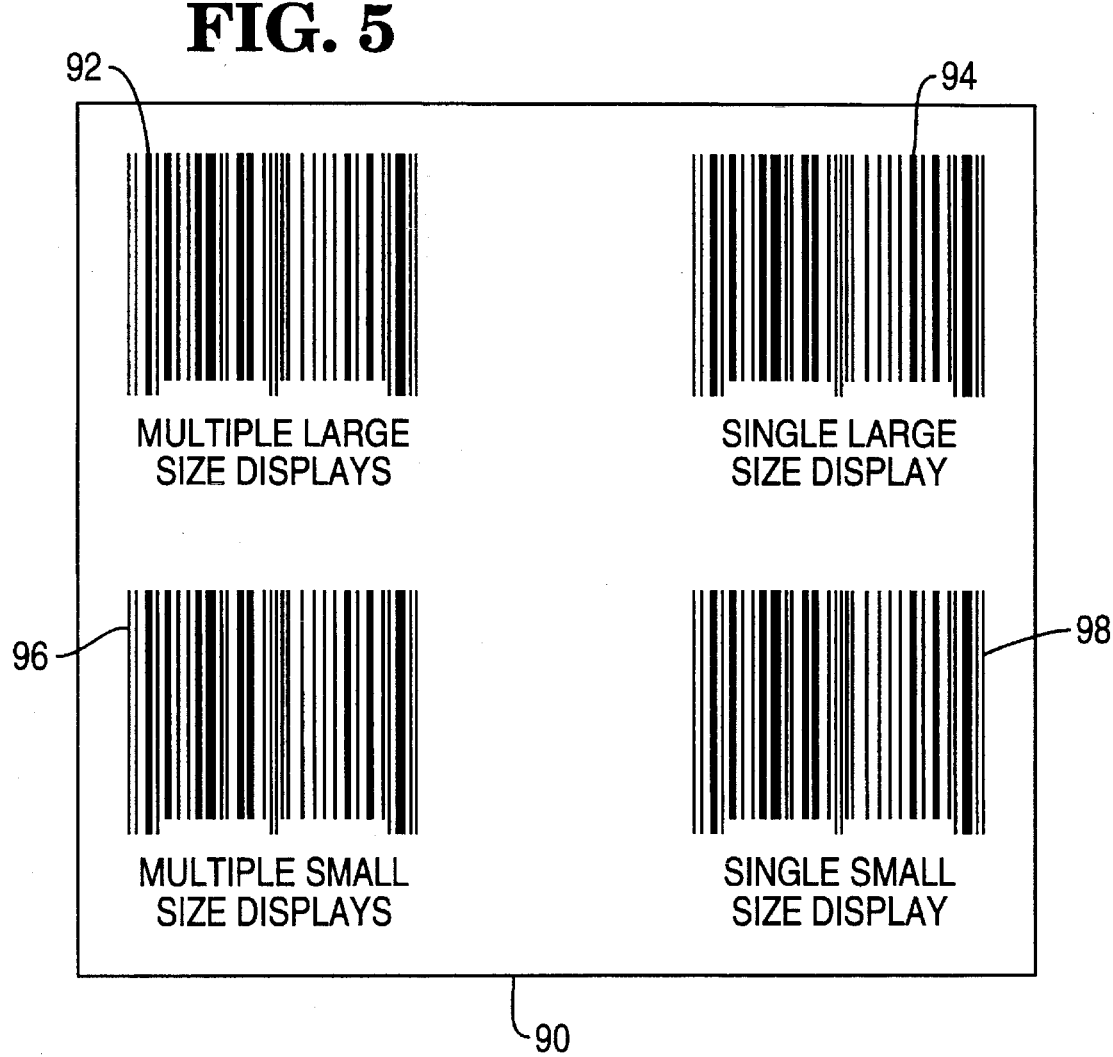
FIG. 5 is a front view of a type card containing bar code labels representing different types of product bar code labels to be scanned.

Turning now to FIG. 5, the scanning process of FIG. 4 can be made more efficient using a display type card 90 by allowing a scanner operator to perform either single or multiple passes. Display type card 90 contains bar code labels which identify electronic shelf displays that have different characteristics, such as size. For example, bar code label 92 tells scanner 18 that a series of merchandise items associated with large size displays 14 are ready for scanning. Bar code label 94 tells scanner 18 that a single merchandise item associated with a large size display 14 is ready for scanning. Likewise, bar code label 96 and 98 tell scanner 18 that merchandise items associated with a series of small size displays 14 and a single small size display 14, respectively, are ready to be scanned.

Figure 6:
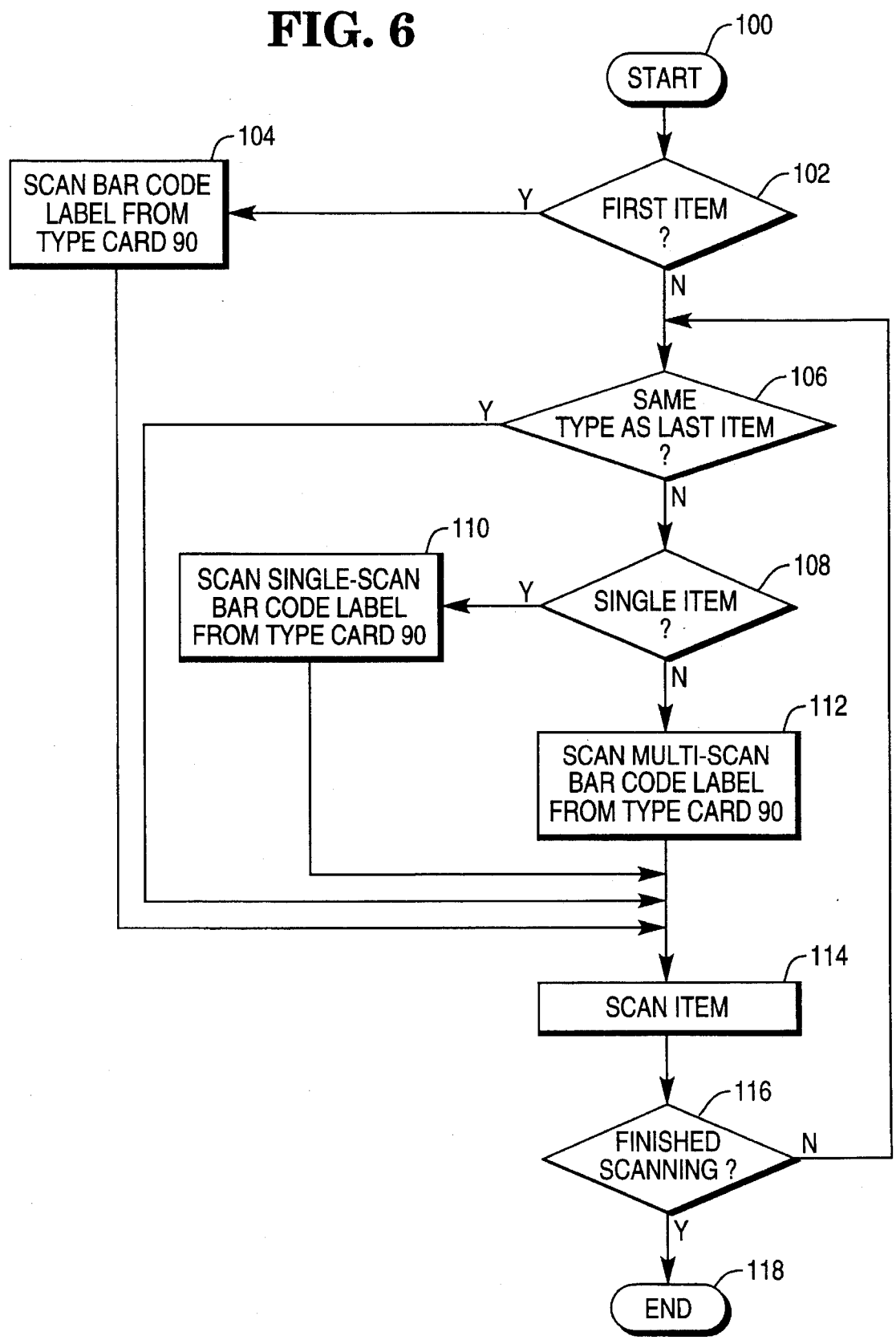
FIG. 6 is a flow diagram illustrating an alternate method of obtaining product information using the type card of FIG. 5.

Referring now to FIG. 6, the improved scanning method using type card 90 begins with step 100.

In step 102, the method determines whether the item to be scanned is the first item. If so, then the method proceeds to step 104 in which scanner 18 scans a bar code label from type card 90 to prepare the scanner for any one of the operations printed on type card 90. The method then proceeds to step 114, in which the item is scanned.

If in step 102 the item is not the first item, the method continues to step 106, in which the method determines whether the item to be scanned is the same as the last item. If so, then the method proceeds to step 114, in which the item is scanned.

If in step 106 the item is different from the previously scanned item, the method proceeds to step 108, in which the method determines whether a single or multi-item scan is to be performed. If a single-item scan is to be performed, the method proceeds to step 110, in which the single-scan bar code is scanned from type card 90. The single item is then scanned in step 114.

If in step 108 a multi-item scan is to be performed, the method proceeds to step 112, in which the multi-scan bar code is scanned from type card 90. The first of the multiple items is then scanned in step 114.

After step 114, the method determines whether further scanning is to be performed in step 116. If so, then the method returns to step 106. If not, then the method ends in step 118.

Referring now to FIG. 7, step 54 of FIG. 3 is explained in more detail, beginning with START 120. This method is useful when identification numbers are not available during manufacture of the electronic shelf displays.

In step 122, a plurality of containers of electronic shelf displays are identified for scanning. Each container is marked with bar code labels which identify the range of identification numbers in the container.

In step 124, a bar code label identifying the first electronic shelf display identification number in the container is scanned.

In step 126, the bar code label identifying the last electronic shelf display identification number in the container is scanned.

In step 128, the method determines whether any more containers remain to be scanned. If so, the method loops back to step 124. If not, then the method ends in step 130.

Referring now to FIG. 8, an alternate method for identifying electronic shelf display identification numbers using type card 90 begins with START 140.

In step 142, electronic shelf displays of a first size are arranged so that the identification numbers are scannable.

In step 144, a bar code label identifying the size is scanned from type card 90.

In step 146, the electronic shelf displays are scanned individually.

In step 148, the method determines whether any more groups require scanning. If so, the electronic shelf displays of another size are arranged so that the identification numbers are scannable in step 150 and the method loops back to step 144.

If all size groups have been scanned, the method ends in step 152.

Although the present invention has been described with particular reference to certain preferred embodiments thereof, variations and modifications of the present invention can be effected within the spirit and scope of the following claims.

What is claimed is:

1. A system for assigning a plurality of merchandise items to a plurality of electronic shelf display modules comprising:

a first database at a place where the merchandise items are sold containing information about the items;

a second database at another place different than the one place containing identification information about the electronic shelf display modules;

a first computer terminal at the one place for downloading the item information; and a second computer terminal at the other place for receiving the downloaded item information, for matching the item information for each item to the identification information of a unique one of the display modules, for creating a record containing the matched information, and for initializing the electronic shelf display modules with information from the record.

2. The system as recited in claim 1, further comprising:

a hand-held scanner for scanning the merchandise items to obtain the item information for storage in the first database, and for downloading the item information to the first computer terminal.

3. A method for assigning a plurality of merchandise items to a plurality of new electronic shelf display modules in a place where the merchandise items and their associated prices are to be displayed comprising the steps of:

(a) providing a first record containing information about the merchandise items;

(b) providing a second record containing identification information for the electronic shelf display modules;

(c) matching the item information for each item to the identification information of a unique one of the electronic shelf display modules by a computer terminal to produce a third record containing the matched information;

(d) initializing the electronic shelf displays with information from the third record by the computer terminal; and (e) storing the third record produced by step (c) in a database by the computer terminal.

4. The method as recited in claim 3, wherein step (a) comprises the substeps of:

(a-1) identifying a first type of electronic shelf display module;

(a-2) identifying a merchandise item associated with the first type of display module;

(a-3) identifying a second type of electronic shelf display module;

(a-4) identifying a merchandise item associated with the second type of display module;

(a-5) scanning a bar code label on the merchandise item associated with the first type of display module by a hand-held scanner;

(a-6) scanning a bar code label on the second type of bar code label by the hand-held scanner;

(a-7) producing the first record from item information from the bar code labels on the merchandise items associated with the first and second types of display modules; and (a-8) storing the first record in another database.

5. The method as recited in claim 3, wherein step (a) comprises the substeps of:

(a-1) identifying a scanning operation;

(a-2) scanning a programming bar code label by a hand-held scanner to program the hand-held scanner for the scanning operation;

(a-3) scanning bar code labels on the merchandise items;

(a-4) producing the first record containing item information from the bar code labels scanned during the scanning operation; and (a-5) storing the first record in another database.

6. The method as recited in claim 5, wherein step (a) further comprises the substeps of:

(a-5) identifying another scanning operation;

(a-6) scanning a programming bar code label by a hand-held scanner to program the hand-held scanner for the other scanning operation;

(a-7) scanning bar code labels on additional merchandise items;

(a-8) producing an updated first record containing item information from the bar code labels scanned during the one and the other scanning operations; and (a-9) storing the updated first record in the other database.

7. The method as recited in claim 3, wherein step (b) comprises the substeps of:

(b-1) identifying a container of electronic shelf display modules for scanning;

(b-2) identifying a first bar code label for an electronic shelf display module having a lowest identification number in the container;

(b-3) identifying a second bar code label for an electronic shelf display module having a highest identification number in the container;

(b-4) scanning the first and second bar code labels by a hand-held optical scanner;

(b-5) producing the second record containing the lowest and highest identification numbers, and all identification numbers in between; and (b-6) storing the second record in another database.

8. The method as recited in claim 3, wherein step (b) comprises the substeps of:

(b-1) identifying a group of electronic shelf display modules for scanning;

(b-2) arranging each electronic shelf display module within the group for scanning;

(b-3) scanning each electronic shelf display module within the group individually to obtain the identification number;

(b-4) producing the second record containing the identification number for each shelf display module in the group; and (b-5) storing the second record in another database.

9. The method as recited in claim 8, wherein step (b) further comprises the substeps of:

(b-5) identifying another group of electronic shelf display modules for scanning;

(b-6) arranging each electronic shelf display module within the other group for scanning;

(b-7) scanning each electronic shelf display module within the other group individually to obtain the identification number; and (b-8) producing an updated second record containing the identification number for each shelf display module in the one and the other groups; and (b-9) storing the second record in another database.

(b-10) storing the updated second record in the other database.

10. The method as recited in claim 3, wherein step (c) comprises the substeps of:

(c-1) storing the second record provided in step (b) in another database located in a place different than the place where the items are sold;

(c-2) downloading the first record from a first computer terminal in the place where the items are sold to a second computer terminal in the place different than the place where the items are sold;

(c-3) storing the first record in the other database by the second computer terminal;

(c-4) establishing first and second input queues for reading, one by one, item information entries and electronic shelf display module information entries in the first and second records by the second computer terminal;

(c-5) merging each item information entry from the first queue with a corresponding electronic shelf display module information entry from the second queue by the second computer terminal to produce a new entry containing both the item information and the corresponding electronic shelf display module information; and (c-6) combining all of the new entries into the third record.

11. A system for assigning a plurality of merchandise items to a plurality of electronic shelf display modules comprising:

a database at a place where the merchandise items are sold containing information about the items and information about the electronic shelf display modules; and a computer terminal at the place for matching the item information for each item to the identification information of a unique one of the display modules, for creating a record containing the matched information, and for initializing the electronic shelf display modules with information from the record.

12. The system as recited in claim 11, further comprising:

a hand-held scanner for scanning the merchandise items to obtain the item information, and for downloading the item information to the computer terminal.

* * * * *